United States Patent
Müller et al.

(10) Patent No.: US 8,309,160 B2
(45) Date of Patent: Nov. 13, 2012

(54) METHOD FOR MODIFYING THE FLAVOR PROFILE OF A PLANT PROTEIN PREPARATION

(75) Inventors: Klaus Müller, Freising (DE); Peter Eisner, Freising (DE); Michael Schott, Langenbach (DE); Jürgen Bez, München (DE); Stefanie Bader, Freising (DE); Katrin Hasenkopf, Freising (DE); Michael Frankl, München (DE)

(73) Assignee: Fraunhofer-Gesellschaft zur Förderung der Angewandten Forschung e.V., München (DE)

( * ) Notice: Subject to any disclaimer, the term of this patent is extended or adjusted under 35 U.S.C. 154(b) by 559 days.

(21) Appl. No.: 12/449,073

(22) PCT Filed: Jan. 22, 2008

(86) PCT No.: PCT/DE2008/000111
§ 371 (c)(1),
(2), (4) Date: Jul. 22, 2009

(87) PCT Pub. No.: WO2008/089734
PCT Pub. Date: Jul. 31, 2008

(65) Prior Publication Data
US 2010/0092654 A1    Apr. 15, 2010

(30) Foreign Application Priority Data
Jan. 23, 2007 (DE) .................. 10 2007 003 262

(51) Int. Cl.
*A23J 1/00* (2006.01)

(52) U.S. Cl. .................. 426/656; 426/533; 426/634
(58) Field of Classification Search .................. 426/656
See application file for complete search history.

(56) References Cited

U.S. PATENT DOCUMENTS

| 6,221,380 B1 * | 4/2001 | Woodroofe et al. ........ 424/438 |
| 2006/0099301 A1 * | 5/2006 | Funda et al. .................. 426/49 |
| 2006/0127560 A1 * | 6/2006 | Back et al. .................. 426/656 |

FOREIGN PATENT DOCUMENTS

| DE | 195 23 154 A1 | 1/1997 |
| WO | WO 2004/034806 A1 | 4/2004 |
| WO | WO 2005/104870 A1 | 11/2005 |

OTHER PUBLICATIONS

Yoshie-Stark et al: "Functional and Bioactive Properties of Rapeseed Protein Concentrates and Sensory Analysis of Food Application With Rapeseed Protein Concentrates"; Lebensmittel Wissenschaft und Technologie, Academic Press, London, Great Britain, vol. 39, No. 5, Jun. 2006, pp. 503-512, XP005300548.

M. Solina et al: "Volatile Aroma Components of Soy Protein Isolate and Acid-Hydrolyzed Vegetable Protein", Food Chemistry, Elsevier Science Publishers Ltd., Great Britain, vol. 90, No. 4, May 2005, pp. 861-873, XP004615603.

E. Makri et al: "Study of Functional Properties of Seed Storage Proteins From Indigenous European Legume Crops (Lupin, Pea, Broad Bean) in Admixture With Polysaccharides", Food Hydrocolloids, Elsevier, vol. 19, No. 3, May 2005, pp. 583-594, XP004719686.

Moure et al: "Functionality of Oilseed Protein Products: A Review", Food Research International, Elsevier Applied Science, Barking, Great Britain, vol. 39, No. 9, Nov. 2006, pp. 945-963, XP005658096.

Doxastakis et al: "Technological Properties and Non-Enzymatic Browning of White Lupin Protein Enriched Spaghetti", Food Chemistry, Elsevier Science Publishers Ltd., Great Britain, vol. 101, No. 1, Aug. 12, 2006, pp. 57-64, XP005754147.

* cited by examiner

*Primary Examiner* — Elizabeth Gwartney
(74) *Attorney, Agent, or Firm* — Breiner & Breiner, LLC

(57) ABSTRACT

A method for modifying the flavor profile of a plant protein preparation, especially a protein preparation from a leguminous plant. The protein preparation is brought into contact with water-soluble carbohydrates in an aqueous solution before being added to a food product, the contact advantageously influencing the flavor profile of protein preparations from leguminous plant, so that the preparations can be used in foodstuffs without essentially changing the flavor thereof.

17 Claims, No Drawings

METHOD FOR MODIFYING THE FLAVOR PROFILE OF A PLANT PROTEIN PREPARATION

FIELD OF INVENTION

The invention relates to a method for modifying the flavour profile of a plant protein preparation, especially a protein preparation from a leguminous plant, and also a plant protein preparation obtained using the method, which can be used in foodstuffs.

BACKGROUND OF THE INVENTION

The use of plant proteins in foodstuffs to replace animal raw materials such as egg or milk is becoming increasingly important. Plant proteins display excellent techno-functional properties in a large number of food applications. Protein preparations made from raw materials such as soya, rice, wheat, peas, lupines or other protein-containing plant seeds are used in foodstuffs as water binders, oil binders, gel-forming agents, emulsifiers or foaming agents, for example.

All known plant protein products made from leguminous plants, such as soya, peas or lupines, display a flavour profile typical of leguminous plants. This was described by tasters as grassy, bean-like, pea-like or green during sensory evaluations and is undesirable in most food applications.

Various attempts have been made to mask this flavour or remove unwanted flavour components. Examples of this are the treatment of protein solutions with milk acid fermentation or the adsorption of flavours by ion exchangers. The addition of masking flavours and very bitter or strong-tasting flavours, such as grapefruit or passion fruit, for example, are also used. The methods and flavours are very expensive and do not produce neutral-tasting protein preparations. The protein preparations cannot therefore be used universally and the choice of flavour is severely restricted. The aforementioned methods are not therefore suitable for producing leguminous plant protein preparations with a neutral flavour profile.

What is understood by flavour profile in this context is the impression of aroma and taste given when smelling and consuming the protein preparations. Depending on the origin of the protein preparations, an aroma and taste impression typical of seeds is evident, which results from the seed's own constituent substances, such as phenolic compounds, for example, or changes in the seed's constituent substances due to chemical, physical or enzymatic changes. Depending on the concentration of strongly flavoured constituent substances and the intensity of the change reactions, the typical seed flavour profile is therefore more or less evident. A neutral flavour profile is characterised by the fact that the original aroma- and flavour-generating components in the protein preparations are no longer significantly noticeable.

SUMMARY OF THE INVENTION

The object of the present invention is to specify a method for modifying the flavour profile of a plant protein preparation for use in foodstuffs, which enables the flavour profile to be modified in such a way that it has a lower intensity of flavours that are undesirable in foodstuffs. The method should also make it possible to provide a protein preparation from leguminous plants, which has the most neutral flavour profile possible, without the flavours typical of leguminous plants.

The object is solved by the method as described herein. Advantageous embodiments of the method are the subject matter of the claims or can be inferred from the following description.

PREFERRED EMBODIMENTS OF THE INVENTION

In the method according to the invention, the plant protein preparation, especially a leguminous plant protein, is brought into contact with soluble carbohydrates in an aqueous solution, in order to bring about the desired modification of the flavour profile. In the case of leguminous plant proteins, the method has a particularly marked effect in lupine proteins. The flavour profile of lupine proteins may be almost completely neutralised by the method according to the invention.

The use of glucose, fructose or xylose or mixtures of the aforementioned substances as carbohydrates is particularly advantageous. It is of course also possible to use other soluble carbohydrates. The carbohydrate or sugar content of the solution is preferably between 0.1 and 20% by weight in the method according to the invention. The method proves particularly economical when the sugar content is between 1 and 5% by weight.

The flavour modification process can be accelerated by raising the temperature to values of between 40° C. and 70° C. When the temperature and exposure time are increased, the leguminous plant flavour shifts towards a milky flavour (40° C.-55° C.), a boiled milk flavour, becoming nutty and caramel-like if there is a further rise in temperature above 60° C. over a long exposure time (>30 minutes). Consequently, different flavour adjustments can be made, depending on the temperature and time chosen. Particularly pleasant and neutral flavours are obtained in the temperature range between 50 and 60° C. with exposure times of between 1 and 30 minutes. Longer exposure times of up to 2 hours are also possible.

The flavour-modifying effect of the method according to the invention is increased at pH values of under 6.9, all other conditions remaining the same; a pH value between 3.5 and 5.5 proves to be particularly advantageous. An especially neutral flavour is also achieved with these values, particularly in the case of lupine protein, wherein the pH value is then preferably adjusted to between 3.5 and 5. The pH value may be adjusted by adding inorganic acids, such as a mineral acid like hydrochloric acid, for example, but also by adding inorganic acids, such as citric acid, for example.

With the proposed method, in addition to attenuating or neutralising the entire flavour profile or individual flavour components of this profile, it is also possible to set a narrow, sharp and distinctive flavour profile by means of a shorter exposure time. The number of different flavour components is reduced in the acid by the reduction in contact time; the product has a more intense flavour. By increasing the pH value, the speed of flavour modification is slowed down and flattened, the number of different flavours is increased and the breadth of taste extended. In addition, when the pH value is increased to values greater than 7, a colour change is initiated and the protein preparation becomes darker. These effects may be very rationally combined for different ingredient needs.

With the practical implementation of the method according to the invention, an aqueous protein solution or a homogeneous protein suspension is preferably supplied to begin with. This involves mixing water with a solid containing leguminous plant protein, for instance. The solid may be a normal commercial plant protein preparation or crushed leguminous plant seeds or shelled and then crushed or flaked leguminous plant seeds or protein-containing fractions of the seeds, which were removed beforehand.

The protein content of the solution is preferably set at a value of between 0.1 and 20% by weight in the method according to the invention. The range between 1 and 5% by weight is particularly advantageous.

For further modification of the flavour profile, it is advantageous for the method to use protein-containing fractions from leguminous plant seeds, which have undergone extractive aqueous treatment beforehand. In this way, the proportion of unwanted flavours in the protein-containing raw material has already been reduced before the method according to the invention is implemented. For the configuration of this sort of pre-treatment through acid pre-extraction, crushed or flaked leguminous plant seeds are mixed with water once or several times, after which the solid material is separated from the liquid. During this pre-extraction, the water has a pH value of under 6 and, particularly advantageously, under 5. In this way, a series of leguminous plant flavours soluble in acid water are dissolved from the crushed seeds and separated.

The method according to the invention produces a leguminous plant protein with a significantly modified flavour profile, which contains virtually none of the characteristic flavours of leguminous plants. As such, it makes a suitable ingredient for a series of flavour-sensitive foodstuffs. Examples of such foodstuffs are emulsions, such as puddings, desserts, ice cream, mayonnaise, chocolate fillings or baking. It may also be used for other functional, texturing purposes, such as water or fat binding, frothing and gelling in sausages and salamis, pasta, baking or patisserie.

For simple incorporation in the formulation during production of the foodstuff, it may be advantageous to assimilate the protein from the process still dissolved or dispersed in water directly or after prior heating or deep-freezing and thawing in a similar way to liquid egg. Expensive fractioning can be dispensed with. However, this means that the carbohydrates from the method according to the invention are also included in the foodstuff, as well as the leguminous plant protein. When sweet-tasting carbohydrates are used, the flavour of the foodstuff is affected, which can be detrimental in sausages and salamis or pasta.

It is therefore advantageous to extract the protein in the purest form possible after it has been treated using the method according to the invention. The protein can be precipitated and mechanically separated for this. It is also possible to separate the carbohydrates from the protein in an aqueous solution by membrane methods such as ultra-filtration, for example. This means that any sweetening of the flavour of the foodstuff when using protein still containing water can be ruled out.

It is also possible to process the protein into a dry preparation. To achieve this, it can be dried along with the carbohydrates or following separation of the carbohydrates. This increases microbiological safety during storage.

Apart from proteins from leguminous plants, the method according to the invention can also be used for other plant proteins. Examples are proteins from oil seeds, such as rape, sunflower or flax seeds. The oil seed proteins have typical flavour profiles, similar to leguminous plants, which can be modified, particularly attenuated, with the help of the method according to the invention.

The product is preferably used as a substitute for milk protein or egg protein in foodstuffs. The similarity in consistency to liquid egg yolk or liquid whole egg means that these food ingredients can be particularly effectively substituted by the product produced using the method according to the invention. The sugar content is tolerable for most applications, but may be felt to be unacceptable for a small number of purposes.

The product obtained following implementation of the method according to the invention can therefore be used in sweet foodstuff emulsions, such as puddings, desserts, sweetened mayonnaises, chocolate fillings or baking. It may also be used as an additive in sausages and salamis, baking or patisserie, if the sugar content does not affect the flavour.

Apart from lupine proteins, the resulting product may also contain proteins from other protein plants. Examples are rape, sunflower, flax seeds and other oil seeds, as well as leguminous plants, such as soya, peas, field beans or others.

An example of an advantageous modification in the flavour profile of a lupine protein preparation using the proposed method is once again briefly explained below. To begin with, a 15% solution of the lupine protein isolate is made. The pH value of the protein solution is adjusted to pH 4 using hydrochloric acid. Xylose is added to the acid protein solution, so that the xylose concentration in the solution is 5%. The protein solution containing the sugar is heated to 60° C. while stirring constantly and kept at this temperature for 15 minutes. After this sustained heating phase, the starting mixture is neutralised with caustic soda and adjusted to a pH value of 6.8. The protein product modified according to the invention is spray-dried following this treatment and can then be used in the production of foodstuffs.

The invention claimed is:

1. A method for modifying a flavor profile of a plant protein preparation comprising a step of adding water-soluble carbohydrates to a plant protein preparation in an aqueous solution before adding the plant protein preparation to a food product, wherein said step of adding said carbohydrates to the plant protein preparation in the aqueous solution occurs at a temperature of between 40° C. and 70° C. for a period of greater than or equal to 1 minute, and the pH value of the aqueous solution is between 3.5 and 5.

2. The method according to claim 1, wherein said temperature is between 50° C. and 60° C. for a period of between 1 and 30 minutes.

3. The method according to claim 1, wherein said temperature is between 60° C. and 70° C. for a period of greater than 30 minutes.

4. The method according to claim 1, wherein content of the carbohydrates in the aqueous solution is between 0.1 and 20% by weight.

5. The method according to claim 4, wherein the content of the carbohydrates in the aqueous solution is between 1 and 5% by weight.

6. The method according to claim 1, wherein protein content of the aqueous solution is between 0.1 and 20% by weight.

7. The method according to claim 6, wherein the protein content of the aqueous solution is between 1 and 5% by weight.

8. The method according to claim 1, wherein the carbohydrates include glucose, fructose, xylose, or mixtures thereof.

9. The method according to claim 1, further comprising precipitating the plant protein preparation and mechanically separating the precipitate from the aqueous solution after said modifying of the flavor profile of the plant protein preparation.

10. The method according to claim 1, further comprising separating the carbohydrates by membrane methods from the plant protein preparation following said modifying of the flavor profile of the plant protein preparation.

11. The method according to claim 1, wherein said plant protein preparation is prepared from lupines.

12. The method according to claim 1, wherein the plant protein preparation is obtained from protein-containing fractions of leguminous plant seeds, wherein said seeds first undergo extractive aqueous pre-treatment, in order to proportionally reduce unwanted flavors.

13. The method according to claim 12, wherein the extractive aqueous pre-treatment includes an acid pre-extraction, in which crushed or flaked leguminous plant seeds are mixed at least once with water, which has a pH value under 6.

14. The method according to claim 12, wherein the extractive aqueous pre-treatment includes an acid pre-extraction, in which crushed or flaked leguminous plant seeds are mixed at least once with water, which has a pH value under 5.

15. A plant protein preparation having a modified flavor profile provided according to the method of one of claim 1, 8, 12 or 13.

16. The plant protein preparation according to claim 15, wherein said plant protein preparation is present in an aqueous solution with said carbohydrates.

17. The plant protein preparation according to claim 15, wherein said plant protein preparation is present in dry form with or without said carbohydrates.

* * * * *